INVENTOR.
TERESIO GASSINO
BY John Toggenburger
AGENT

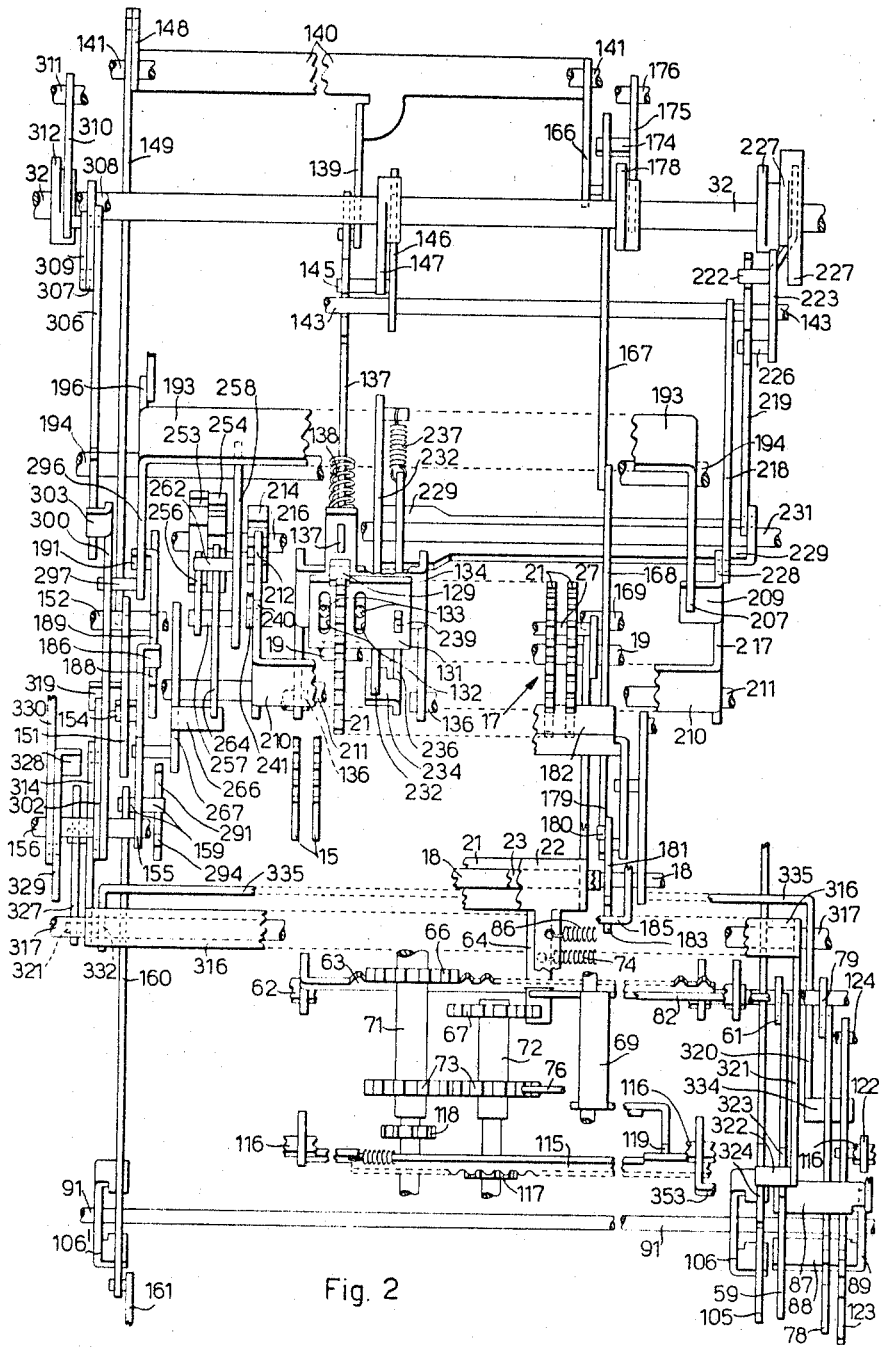

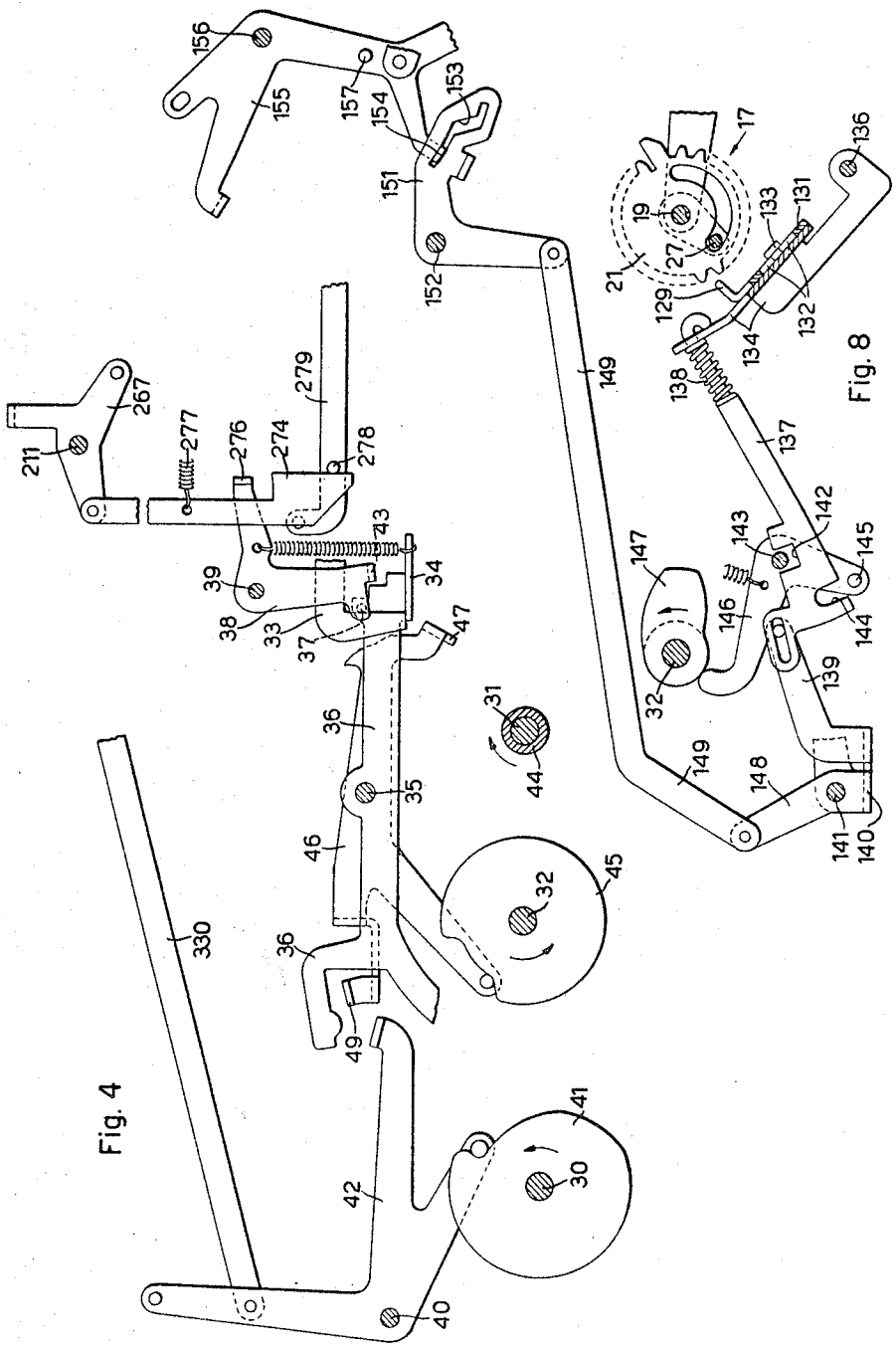

INVENTOR.
TERESIO GASSINO
BY John Toggenburger
AGENT

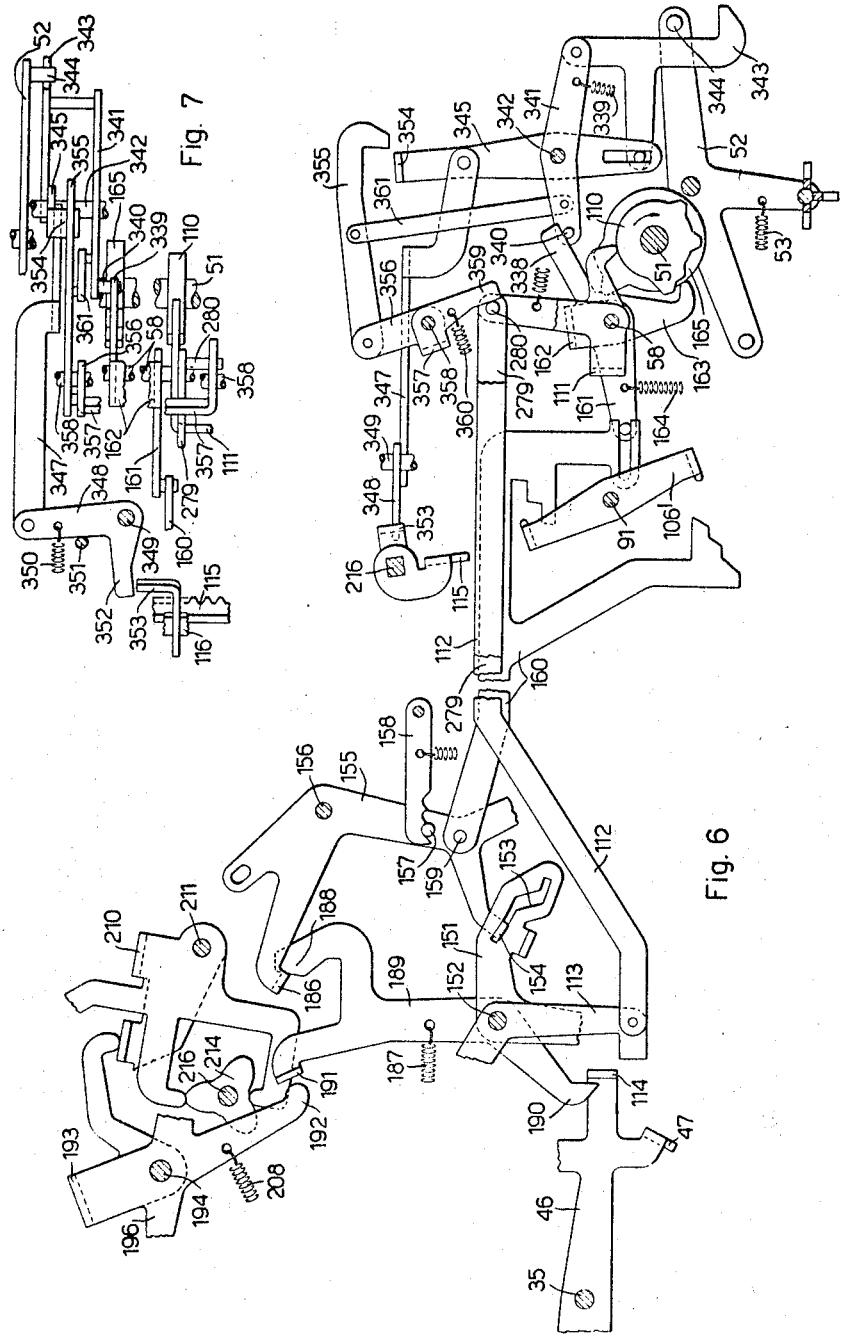

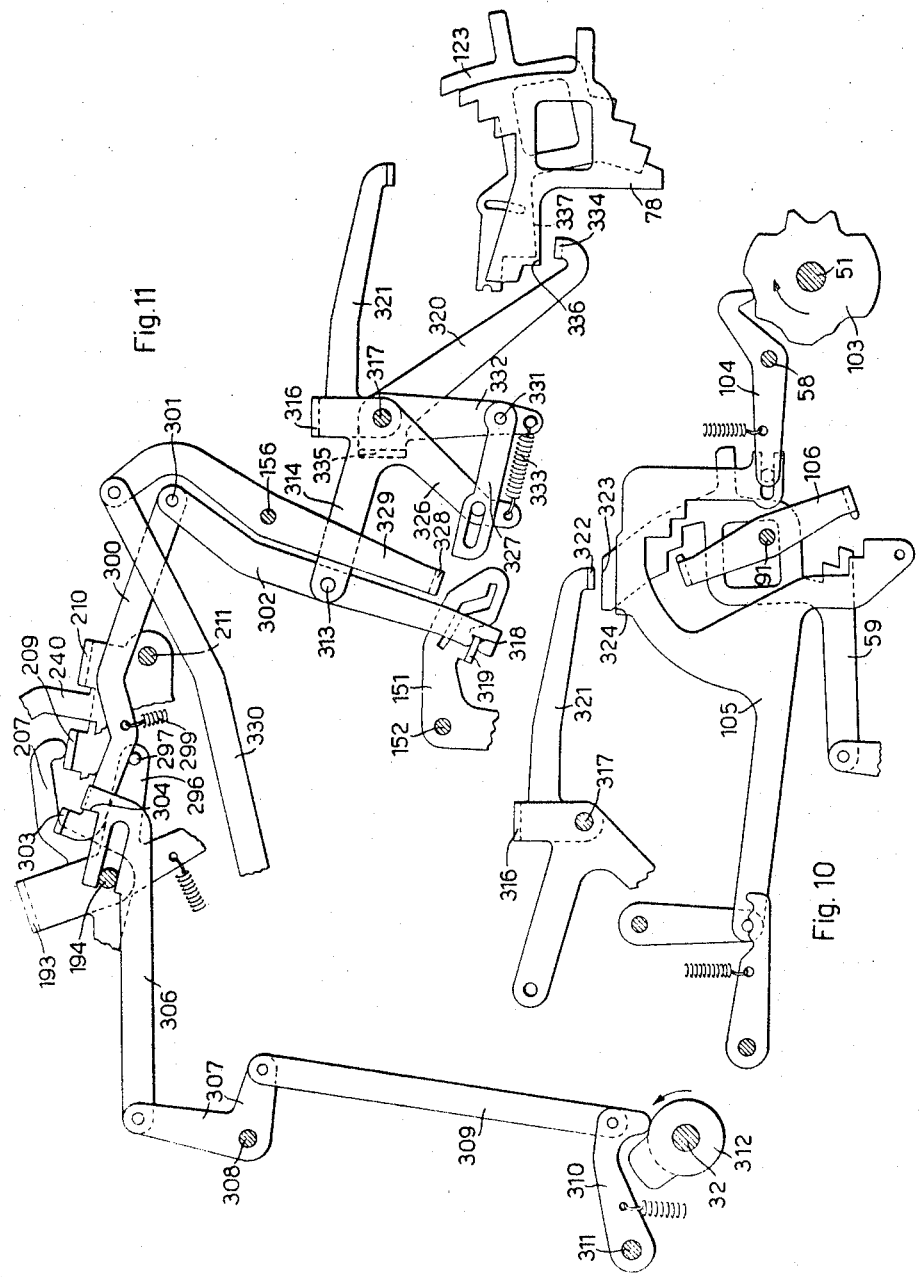

United States Patent Office 3,423,018
Patented Jan. 21, 1969

3,423,018
TEN KEY CALCULATING MACHINE ADAPTED TO EFFECT MULTIPLICATIONS AS WELL AS DIVISIONS
Teresio Gassino, Ivrea, Turin, Italy, assignor to Ing. C. Olivetti & C., S.p.A., Ivrea, Italy, a corporation of Italy
Filed Apr. 1, 1966, Ser. No. 539,379
Claims priority, application Italy, Apr. 10, 1965, 8,941
U.S. Cl. 235—63
Int. Cl. G06c 23/00
12 Claims

ABSTRACT OF THE DISCLOSURE

A ten key calculating machine comprises a first memory for storing a multiplicand or a quotient, and a second memory for storing a multiplier or a divisor. The second memory is transversely movable step by step under the control of an overdraft control member in a division cycle wherein no overdraft occurs. The counting member is transversely stationary and is automatically disabled upon having counted nine steps for a quotient order. A member indicating the number of orders of the quotient is moved with the second memory during the dividend-divisor alignment and is adapted to stop the division upon being restored.

---

This invention relates to a ten key calculating machine adapted to effect multiplications as well as divisions, comprising a first memory for storing a multiorder multiplicand, and a second memory for storing a multiorder multiplier, said memories comprising in each order a differentially settable member and being adapted to cooperate with a set of actuators.

In the known calculating machines the divisor is always stored into the same memory provided for storing the multiplicand, while the quotient is accumulated in the memory provided for the multiplier. Therefore, in these calculating machines the same memory must cooperate with both the multiplication counting member, and with the division counting member, whereby they are intricate and cause space problems. Furthermore in these machines the operator must decide what memory is to be selected for storing the first factor.

This and other disadvantages are obviated by the calculating machine according to the invention, which is characterized by means for storing a divisor in said second memory, counting means being provided for sequentially accumulating in each order of said first memory the digits of a quotient.

An object of the invention is to provide a calculating machine adapted to effect multiplications as well as divisions, and wherein the first memory is adapted at first to store the first factor of a multiplication or a division, and then to store the result thereof, namely the product or the quotient.

Another object of the invention is to provide a calculating machine wherein the quotient is accumulated in a transversely movable memory beginning from the highest order thereof.

Other objects and characteristics of the invention will become apparent from the following description of a preferred embodiment thereof, and from the enclosed drawings, in which:

FIG. 2 is a partial plan view of the calculating machine of FIG. 1;

FIG. 4 is another left hand partial sectional view of the calculating machine;

FIG. 6 is a fourth left hand partial sectional view of the calculating machine;

FIG. 7 is a plan view of a detail of FIG. 6;

FIG. 8 is another left hand partial sectional view of the calculating machine;

FIG. 10 is a left hand sectional view of a detail of the calculating machine;

FIG. 11 is a left hand sectional view of another detail of the calculating machine.

General description

Figures 1, 3:
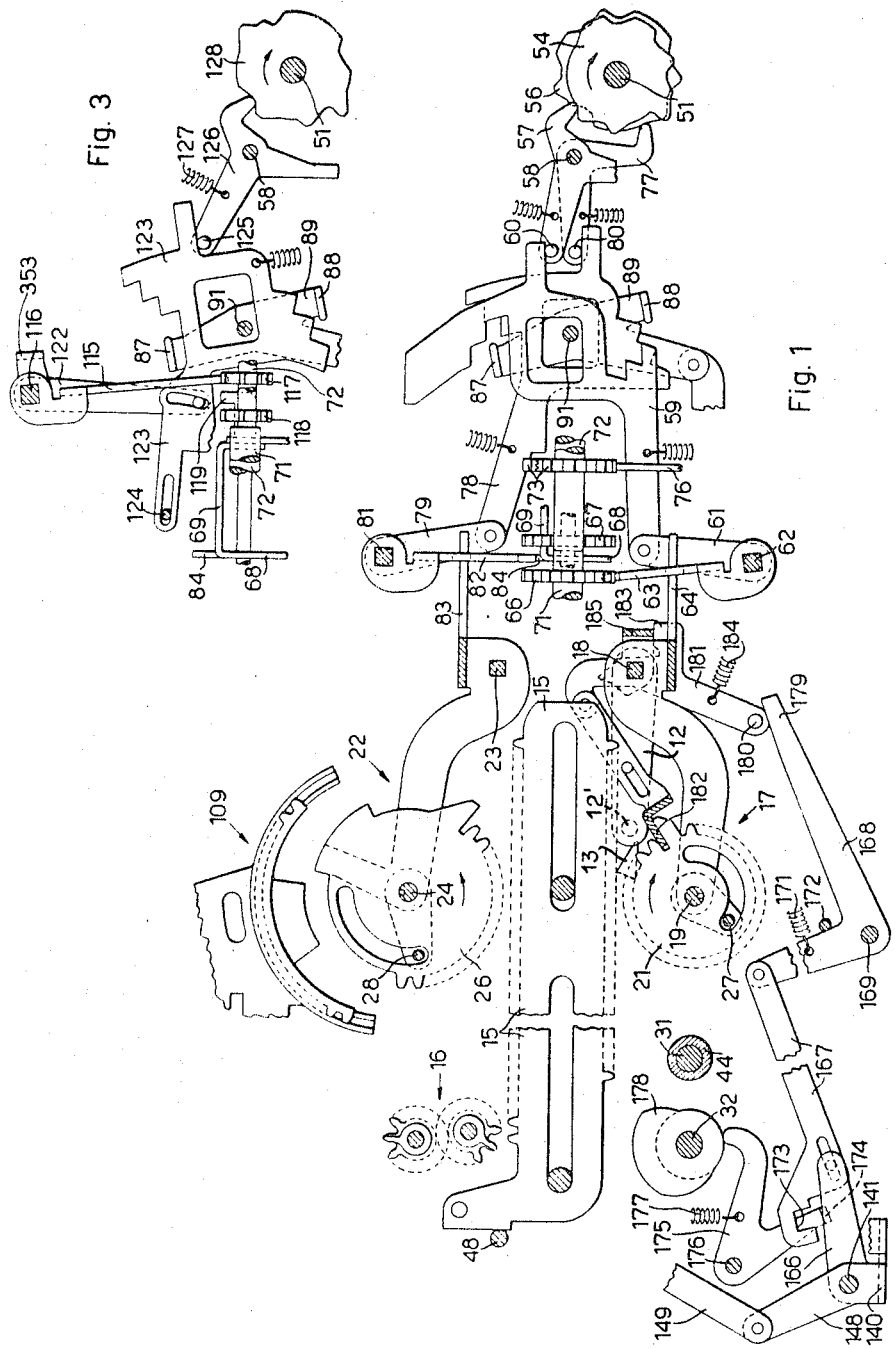
FIG. 1 is a left hand partial longitudinal sectional view of a ten key calculating machine according to the invention.
FIG. 3 is a left hand longitudinal sectional view of a detail of the calculating machine.

With reference to the FIG. 1, the calculating machine comprises a set of actuators formed of racks 15 longitudinally slidable and adapted to cooperate in a known manner with a totalizer 16 having two sets of intermeshing pinions. The calculating machine is provided with a first memory formed of a set up carriage 17 transversely slidable along a square shaft 18 rotatably mounted on the machine frame and along a shaft 19 vertically movable on the same frame. The carriage 17 is provided in each order with a differentially settable member or toothed sector 21 rotatably and slidably mounted on the shaft 19 and adapted to be set up clockwise from the zero position indicated in FIG. 1.

The calculating machine is also provided with a second memory formed of a second set up carriage 22, substantially symmetric to the carriage 17 with respect to the racks 15. The carriage 22 is transversely slidable along a second square shaft 23 rotatably mounted on the machine frame and along a shaft 24 vertically movable on said frame. The carriage 22 is provided in each order with a differentially settable member or toothed sector 26 rotatably and slidably mounted on the shaft 24 and adapted to be set up counterclockwise from the zero position of FIG. 1.

The sectors 21 of the carriage 17 and the sectors 28 of the carriage 22 are selectively engaged with the racks 15 and disengaged therefrom at instants corresponding to the operation to be effected. To this end secured to the square shaft 18 is an arm 12 having a pin 12' adapted to be engaged by the tapered edge of a control member 13 longitudinally reciprocable under the control of suitable cams not shown in the drawings, in the manner described in the United States patent application No. 405,368, dated Oct. 21, 1964, now Patent No. 3,260,449.

The sectors 21 of the carriage 17 and the sectors 26 of the carriage 22 are normally rotated according to the last amount set up therein. A first universal bar 27 is adapted to be rocked counterclockwise for zeroising all the sectors 21 of the carriage 17, while a second universal bar 28 is adapted to be rocked clockwise for zeroising all the sectors 26 of the carriage 22. The sectors 21 and the sectors 26 are adapted to be set up order by order through a single ten key keyboard not shown in the drawings. Upon setting up the first order of a new amount the universal bar 27 or 28, is automatically rocked for zeroizing the amount previously set up in the corresponding carriage 17, 22, in the manner described in the United States patent application No. 398,915, dated Sept. 24, 1964, now Patent No. 3,319,882.

The calculating machine is provided with a cyclically operating mechanism comprising a set of three shafts 30, 31 and 32 (FIG. 4) substantially described in the United States patent application No. 506,958, dated Nov. 9, 1965, now Patent No. 3,331,556. The shaft 30 is rotated counterclockwise one revolution at the depression of any function motor key. To this end any motor key is adapted to displace a latch 33 (FIG. 4) rearwards which on one hand is contacted by a lug 34 a lever 35 fulcrumed on a shaft 35 and adapted to control the clutch of the shaft 30, on the other hand it is contacted by a pin 37 of a lever 38 fulcrumed at 39. During the cycle of the shaft 33, a cam 41 through a lever 42 fulcrumed at 40 restores the lever 36 clockwise. The lever 36 is now locked by a lug 43 of the lever 38 in the clockwise position, till the latch 33 will be restored forwards.

The shaft 31 is normally rotated clockwise one revolution at the depression of any key of the ten key keyboard to individually set up the sectors 21 and 26. Rotatably mounted on the shaft 31 is a sleeve 44 carrying a group of cams and normally locked at rest. The shaft 30 during its cycle causes the sleeve 44 to be secured to the shaft 31 and starts a first part of an auxiliary cycle of the shaft 31 and sleeve 44. Near the end of this first part of the auxiliary cycle, a cam of the sleeve 44 yieldably rocks a lever 46 clockwise on the shaft 35. The lever 46 on one hand through a lug 47 arrests the cycle of the shaft 31 upon being rotated 270 degrees, on the other hand it starts a cycle of the third shaft 32 (FIG. 1) which is rotated counterclockwise. The shaft 32 controls the conventional universal bar 48 of the racks 15, whereby it represents the main shaft of the machine. However, during the cycle of shaft 32, the lever 46 (FIG. 4) is held positively rocked clockwise by a cam 45 and through a lug 49 it prevents the lever 36 from being rocked counterclockwise. At the end of the cycle of the main shaft 32, the lever 46 is returned to the position of FIG. 4, whereby the auxiliary shaft 31 may be rotated again for effecting a second part of the auxiliary cycle. The latch 33 is now restored forwards and rocks the lever 38 counterclockwise, thus releasing the lever 36, whereby the lug 34 contacts again the latch 33.

Furthermore the calculating machine is provided with a program control device comprising a shaft 51 (FIG 1) having a set of cams each one adapted to control a machine function, substantially in the manner described in the copending United States patent application Ser. No. 533,974, dated Mar. 14, 1966, entitled "Program Control Device for a Calculating or Like Machine." Particularly, the shaft 51 is selectively rotated under the control of a cam of the sleeve 44 each time a lever 52 (FIG. 6) can be rocked clockwise by a spring 53 under the control of the depressed key. The shaft 51 is sequentially arrested in a group of stations according to the operation to be effected. The shaft 51 is provided with a pair of cams 54 and 56 (FIG. 1) each one associated with one of the carriages 17 and 22 to control the transverse movement thereof. Particularly, the cam 54 through a lever 57 fulcrumed at 58 is adapted to locate a link 59, a spring urged to contact a pin 60 thereof, into three different angular positions. The link 59 is connected to a lever 61 secured to a square shaft 62 slidably mounting a rack 63. This latter is provided with a notch engaged by a projection 64 of the carriage 17, and is adapted to alternately engage a pinion 66 in order to be displaced leftwards, or a pinion 67 in order to be displaced rightwards, or an arm 68 of a bail 69 in order to be transversely locked. The pinion 66 is secured to a longitudinal shaft 71 adapted to be rotated by a clutch not shown in the figure, whereas the pinion 67 is secured to a second shaft 72 connected to the shaft 71 through a pair of similar pinions 73, to be rotated in an opposite direction with respect thereto. A spring 74 (FIG. 2) urges the carriage 17 rightwards, but it is normally ineffective because the pinions 73 are locked by a latch 76.

Similarly the cam 56 (FIG. 1) of the shaft 51, through a lever 77 also fulcrumed at 58 is adapted to locate a second link 78, spring urged to contact a pin 80 thereof, into three different positions. The link 78 is connected to a crank lever 79 secured to a square shaft 81 slidably mounting a second rack 82 engaging a projection 83 of the carriage 22. The rack 82 is adapted to engage the pinion 67 in order to be displaced leftwards, or the pinion 66 in order to be displaced rightwards, or another arm 84 of the bail 69 in order to be transversely locked. The carriage 22 is also urged rightwards by a spring 86 (FIG 2).

The links 59 and 76 (FIG. 1) predisposed by the corresponding cams 54 and 56 may be longitudinally displaced, in order to position the racks 63 and 82, by two lugs 87 and 88 of a lever 89 fulcrumed on a shaft 91 in turn rotatably mounted on the machine frame. The lever 89 is rotated clockwise at the beginning of each cycle of the shaft 30 and during the first part of the auxiliary cycle before the program shaft 51 is displaced, whereby the control effected by the program when it reaches a specific station will be actuated only during the next following machine cycle.

Associated with each one of the two carriages 17 and 22 is a sector 92 (FIG. 5), respectively 93, normally engaging a corresponding toothed edge of a slide 94, which may be transversely displaced by a pinion 96 synchronously rotating with the shaft 71 (FIG. 1). The sectors 92 and 93 (FIG. 5) are selected by a cam of the program shaft 51 and are operable for controlling the transverse movement of the associated carriage, while their position on the slide 94 represents a record of the number of orders set up on the same carriage.

To this end the clutch of the shaft 71 may be engaged by causing a shaft 97 to be rotated counterclockwise either by a cam 100 of the shaft 30, or by a cam of the shaft 31 not shown in the drawings. These two cams rock counterclockwise a lever 98 rotatably mounted on the shaft 97, whereby a spring 99 urges counterclockwise a lever 101 secured to the shaft 97. The clutch of the shaft 71 is then disengaged under the control of the sector 92, 93 associated with the selected carriage.

Figure 5:
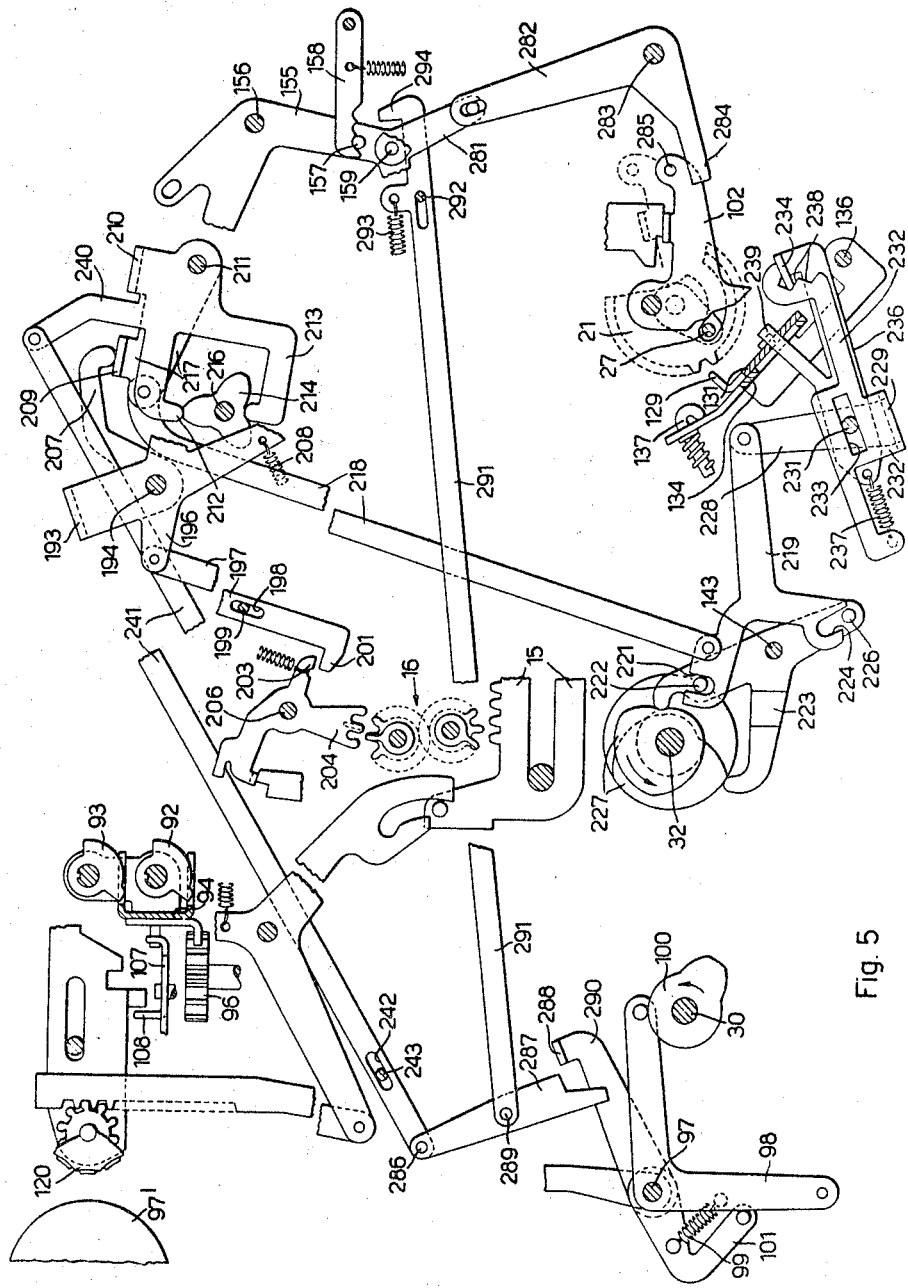
FIG. 5 is a third left hand partial longitudinal sectional view of the calculating machine.

To this end the sectors 92 and 93 are controlled by a lever 102 corresponding to the lever indicated by 174 in the cited Patent No. 3,319,882, which when located in the position of FIG. 5 causes the sector 92 or 93 to cancel the record of the number of set up orders, whereas when it is located in the position shown by broken lines in FIG. 5, the sector 92 or 93 causes the slide 94 to be moved step by step.

The carriages 17 and 22 and the slide 94 are restored rightwards under the control of a cam 103 (FIG. 10) of the program shaft 51, which through a lever 104 fulcrumed at 58 locates a link 105 into three different angular positions. The link 105 may be longitudinally displaced into three corresponding positions by a pair of lugs of a lever 106 secured to the shaft 91 and cyclically rotated clockwise by a cam of the shaft 30 not shown in the drawings. In the second part of the auxiliary cycle, if the link 105 is now located in the central position as shown in FIG. 10, the latch 76 (FIG. 1) releases the pinions 73, whereby the carriages 17, 22 having the corresponding rack 63, 82 engaged with the pinion 66, and 67 respectively, is restored rightwards together with the slide 94 (FIG. 5). On the contrary, if the link 105 (FIG. 10) is displaced forwards, besides the releasing action of the latch 76 (FIG. 1), the bail 69 releases the racks 63, 82, whereby also the carriage 17, 22 having the corresponding rack 63, 82 engaged with the bail 69 is restored, while the slide 94 (FIG. 5) is restored under the urge of its spring. Finally, if the link 105 (FIG. 10) is displaced rearwards, then the latch 76 and the bail 69 (FIG. 1) remain unaffected thereby.

The calculating machine is provided with a printing device comprising a set of typewheels 120 (FIG. 5) associated with the actuators 15 and adapted to effect an imprint on the conventional printing platen 97. The typewheels 120 are controlled by a zero printing control device comprising a lug 108 of a transversely movable slide 107 in the manner described in the cited United States Patent No. 3,260,449. To this end before printing each amount, the carriage 17 (FIG. 1) is displaced leftwards together with the slide 94 (FIG. 5), till the plate 107 displaced leftwards by the slide 94 is located at the left of the highest significant order of the amount to be printed, whereby the carriage 17 is aligned with the amount to be printed. In the case of a total taking cycle, the member 13 through the pin 12' and the arm 12 causes the sectors 21 of the carriage 17 to engage the racks 15 at the end of their leftward stroke in FIG. 1, whereby the taken total is automatically transferred back to the carriage 17.

In order to increase the machine speed in the repeated cycles during which no printing is effected, the shaft 32 may be axially displaced rightwards under the control of another cam of the program shaft 51 (FIG. 1), and is then rotated at a speed higher than the speed of the normal cycles in the manner described in the cited Patent No. 3,331,556. These normal cycles will thus be called lower speed cycles, while the other will be called higher speed cycles, the shaft 32 being provided with two different sets of cams associated with said two different speeds.

Finally the calculating machine is provided with an automatic multiplication device of the type described in the copending patent application Ser. No. 539,457, dated Apr. 1, 1966, entitled: "Automatic Short-Cut Multiplication Device for a Calculating Machine." To effect a multiplication the multiplicand is firstly set up into the carriage 17. Upon depressing a first key or multiplicand printing key not shown in the drawings, on one hand the multiplicand is printed, on the other hand the program shaft 51 begins a sequence of displacements for controlling the multiplication. Thus the program predisposes the carriage 22 for setting up the multiplier, which may be set up by the ten key keyboard. Now a second key or multiplication key not shown in the drawings, is depressed and under the control of the program shaft 51 causes the sectors 26 to be individually sensed by a sensing device generically indicated by 109 for controlling the number of cycles required by the corresponding order of the multiplier. It is thus evident that the first memory 17 is adapted to store a multiorder multiplicand whereas the memory 22 is adapted to store a multiorder multiplier.

Setting and printing of a dividend

The calculating machine is provided with an automatic division device which will be described hereafter. The dividend of the division is normally set up through the ten key keyboard into the carriage 17 as any set up amount. A division key not shown in the drawings is then depressed and causes a machine cycle during which the set up amount is accumulated into the register 16 and printed on the paper. Furthermore the division key causes the program shaft 51 to begin a sequence of displacements for controlling the division, in the manner described in the cited patent application Ser. No. 533,974, entitled: Program Control Device for a Calculating or Like Machine. The division sequence requires that the program shaft 51 be arrested in the stations X, XIII, XV, XVI, XVII, XVIII, XIX, and then returned to the station I. During the first part of the auxiliary cycle relating to the dividend printing, the program shaft 51 is displaced to the station X. In the second part of this auxiliary cycle, the latch 76 is disengaged from the pinions 73, whereby the spring 74 (FIG. 2) returns the carriage 17 rightwards together with the slide 94 (FIG. 5). At the end of the second part of the auxiliary cycle the machine is stopped.

The dividend may be contained in the carriage 17 (FIG. 1) as a back transfer of a total taken, or as a previous addend. In this case the division key is to be depressed, without previously setting up the dividend into the carriage 17 through the ten key keyboard. The carriage 17 is then displaced leftwards during the cycle of the shaft 30, when the clutch of the shaft 71 is engaged by the cam 100 (FIG. 5). Similarly if a dividend is formed of a sum of amounts, after setting up the last amount to be added into the carriage 17 (FIG. 1), the division key is depressed. Now this last amount is added into the totalizer 16, whereas the total contained therein is enabled to be used as a dividend.

Setting and printing of the divisor

Now the divisor is set up on the ten key keyboard. Since the program shaft 51 is now located in the station X, the cam 54 has predisposed the link 59 for engaging the rack 63 with the arm 68 of the bail 69, while the cam 56 has predisposed the link 78 for engaging the rack 82 with the pinion 67. Furthermore the carriage 22 is selected. In the first set up cycle of the auxiliary shaft 31 the lever 89 is rocked clockwise and causes the links 59 and 78 to effect the engagements so predisposed, whereby the set up divisor is now stored into the carriage 22. It is thus apparent that the means 51, 78, 67 cause the divisor set up through the keyboard to be stored into the memory 22, which in the multiplication is adapted to store the multiplier.

In the station X the program allows the depression of the add key, not shown in the drawings, and causes same to act as a division starting key. Upon depressing this key the latch 33 (FIG. 4) is displaced rearwards and releases the lever 36. This latter then starts a cycle of the shaft 30, which then starts the first part of an auxiliary cycle. A cam 110 (FIG. 6) of the program shaft 51, in the station X, through a bail 111 and a link 112, rocks a latch 113 clockwise. The latch 113 is brought into the path of a lug 114 of the lever 46, which is prevented from rocking clockwise, whereby the cycle of the main shaft 32 cannot start and the second part of the auxiliary cycle is effected in prosecution of the first part. During the first part of this auxiliary cycle the shaft 51 is also displaced to the station XIII. In the second part of this auxiliary cycle the latch 76 (FIG. 1) does not release the pinions 73, whereby the carriage 22 is not returned to right. Finally during this auxiliary cycle the universal bar 27 is rotated counterclockwise thus zeroizing the sectors 21 of the carriage 17.

In the station XIII of the program a non add key is automatically depressed thus starting a cycle of the shaft 30 followed by an auxiliary cycle, and a cycle of the main shaft 32. The cam 56 in the station XIII has predisposed the link 78 into its central position. During the cycle of the shaft 30 to the lever 89 causes the rack 82 to engage the arm 84 of the bail 69. Then during the first part of the auxiliary cycle the program shaft 51 is displaced to the station XV. Furthermore, during the cycle of the main shaft 32 the divisor stored in the carriage 22 is printed on the paper under the dividend. Finally, during the second part of the auxiliary cycle the latch 76 releases the pinions 73 whereby the slide 94 is returned to right by its spring, while the carriage 22 (FIG. 1) remains in the reached transverse position.

If an amount already set up into the carriage 22 is to be used as a divisor the add key is to be depressed after the dividend is printed without setting up the divisor on the keyboard. In this case, at the beginning of the cycle of the shaft 30, the lever 89 causes the rack 79 to engage the pinion 69. Thereafter the cam 100 causes the clutch of the shaft 71 to be engaged for displacing the carriage 22 leftwards, whereby this carriage is tabulated to the transverse position reached in the case the same divisor is set up through the keyboard.

Automatic alignment of the divisor with the dividend

The calculating machine comprises a rack 115 (FIGS. 2 and 3) which will be called hereinafter "capacity rack." The rack 115 is slidably mounted on a square shaft 116 rotatably mounted on the machine frame, and is adapted to alternately engage a pinion 117 of the shaft 72 for being displaced leftwards, or a pinion 116 of the shaft 71 for being displaced rightwards, or still a projection 119 of the bail 69 for being transversely locked. The rack 115 is normally urged rightwards by a spring 121 and engages the pinion 117.

Secured to the shaft 116 is a lever 122 pin and slot connected to a link 123 slidably mounted on a stationary pin 124. The link 123 is also spring urged to contact a pin 125 secured to a lever 126 fulcrumed at 58 and normally urged by a spring 127 to contact a cam 128 of the program shaft 51. The link 123 is provided with two complementary stepped edges cooperating with the lugs 87 and 88 of the lever 89. In the station XV of the program the cam 128 predisposes the link 123 in a lower position, while the cam 56 (FIG. 1) predisposes the link 78 in a raised position.

In the station XV of the program a sub total key not shown in the drawings is automatically depressed for causing a new machine cycle wherein the divisor is automatically aligned with the dividend. At the beginning of the new cycle of the shaft 30, the lever 89, through the links 78 and 123 (FIGS. 1 and 3) causes the rack 82 to engage the pinion 67, and the capacity rack 115 to engage the pinion 117. The rack 115, which at present is in its right end position, is thus connected to the carriage 22.

During the first part of the following auxiliary cycle, the program shaft 51 is displaced to the station XVI. Now, during the cycle of the main shaft 32, while the racks 15 engage the totalizer 16, the clutch of the shaft 71 is engaged and on one hand displaces the carriage 22 and the rack 115 leftwards, on the other hand displaces the slide 94 (FIG. 5) and the plate 107 leftwards till this latter is located on the left of the highest significant order of the dividend contained in the totalizer, in the manner described in the cited Patent No. 3,260,449. The divisor stored in the carriage 22 is thus aligned with the dividend contained in the totalizer 16, while the capacity rack 115 is displaced leftwards as many steps as those effected by the carriage 22 to become aligned with the dividend. This number of steps corresponds to the maximum number of orders the quotient may have. During this cycle the printing is prevented by the program in any known manner.

The slide 107 may also be controlled by a control member of the printing of the decimal point, in order to control the printing of a zero at left of the decimal point and the zeros locking at the right thereof. In this case the carriage 22 is aligned with the zero at left of the decimal point as described in the cited Patent No. 3,260,449, with reference to the slide there indicated by the numeral 108 and the control member there indicated by the numeral 97.

Quotient accumulation

The calculating machine is provided with counting means for sequentially accumulating in each order of the first memory or carriage 17 the digits of a quotient. Particularly said counting means comprise a counting finger formed of a bent lug 129 (FIG. 8) provided on a slide 131 and normally located in front of the first sector 21 at the right of the racks 15 (FIG. 2). The slide 131 is provided with a pair of slots 132 slidably mounted on a pair of pins 133 of a bail 134 fulcrumed on a stationary shaft 136 (FIG. 8). An end of a link 137 enters a notch of the bail 134, while a compression spring 138 is inserted between the bail 134 and a shoulder of the link 137. This latter is pin and slot connected to an arm 139 of a bail 140 pivoted on a stationary shaft 141. The link 137 is also provided with a recess 142 normally engaging a stationary shaft 143 and with a recess 144 adapted to be engaged by a pin 145 of a lever 146 fulcrumed on the shaft 143. The lever 146 is adapted to cooperate with a cam 147 secured to the main shaft 32, when the latter is displaced rightwards to effect the higher speed cycles.

Another arm 148 of the bail 140 is connected through a link 149 to a lever 151 pivoted on a stationary shaft 152. The lever 151 is provided with a cam slot 153 cooperating with a lug 154 of a lever 155 fulcrumed at 156 and carrying a pin 157 cooperating with a spring urged locking member 158 (FIG. 6).

Fulcrumed on a pivot 159 of the lever 155 is a division control member or link 160 pin and slot connected with an arm 161 of a bail 162 fulcrumed at 58. The bail 162 is also provided with a second arm 163 normally urged by a spring 164 to contact a cam 165 of the program shaft 51. The link 160 is provided with two complementary stepped edges adapted to be operated by a lever 106' also secured to the shaft 91 and therefore bodily rotatable with the lever 106 (FIG. 2).

A third arm 166 (FIG. 1) of the bail 140 is pin and slot connected with a link 167 in turn linked with a lever 168 fulcrumed at 169 and normally urged by a spring 171 to contact a stationary stop 172. The link 167 is provided with a recess 173 adapted to engage a lug 174 of a lever 175 fulcrumed at 176 and urged by a spring 177 to cooperate with a cam 178 of the main shaft 32 when this latter is displaced rightwards. The lever 168 is provided with a projection 179 adapted to cooperate with a pin 180 of a lever 181 fulcrumed on the cylindrical end portion of the square shaft 18. Fulcrumed on the lever 181 is a locking bar 182 for the sectors 21, whereas a projection 183 of the lever 181 is normally urged by a spring 184 to contact a bail 185 secured to the shaft 18 and adapted to control the engagement of the sectors 21 with the racks 15.

The lever 115 (FIG. 6) is provided with a second lug 186, normally urged by a spring 187 to contact a projection 188 of another lever 189 fulcrumed on the shaft 152. The lever 183 is provided with a projection 190 adapted to cooperate with the lug 114 of the lever 46. The lever 189 is also provided with a lug 191 adapted to cooperate with an arm 192 of a bail 193 fulcrumed on a stationary shaft 194. Another arm lever 196 of the bail 193 is connected to a slide 197 (FIG. 5) provided with a slot 198 slidably mounted on a stationary pin 199 and provided with a shoulder 201 adapted to cooperate with a projection 203 of a ten transfer member or toothed sector 204 fulcrumed at 206 associated with the highest order of the totalizer 16. The sector 204 is adapted to be rotated clockwise when said highest order crosses its zero position in a manner known per se.

The bail 193 is provided with a third arm 207 normally urged by a spring 208 to contact a lug 209 of an arm 217 of a bail 210 fulcrumed at 211. The bail 210 is provided with a pair of arms 212 and 213 cooperating with a three lobed cam 214 secured to a shaft 216 adapted to be rotated 60 degrees step by step. The arm 217 of the bail 210 is connected through a link 218 to a forked lever 219 having a first notch 221 normally engaged with a pin 222 of a lever 223 fulcrumed on the shaft 143 and a second notch 224 adapted to engage a second pin 226 of the lever 223. This latter is adapted to cooperate with a pair of complementary cams 227 secured to the main shaft 32 when the latter is displaced rightwards.

The lever 219 is fulcrumed on an arm 228 of a bail 229. The arm 228 is fulcrumed with much clearance on a stationary shaft 231, while a second arm 232 of the bail 229 engages the shaft 231 through a slot 233 so long as to enable the arm 232 to be displaced along the slot 233 and the bail 229 to tilt with respect to the shaft 231. The arm 232 is normally urged by a spring 237 to contact a lug 234 of a lever 236 and is provided with a V-shaped edge 238 locking the lug 234. The lever 236 is also provided with a projection 239 engaging a notch of the slide 131.

The bail 210 is provided with an arm 240 linked with a link 241 having a slot 242 slidably mounted on a stationary pin 243. The link 241 is provided with a pin 244 (FIG. 9) adapted to cooperate with a projection 245 of a lever 246 fulcrumed at 247. Rotatably mounted on the lever 246 is a pawl 248 adapted to cooperate with two shoulders 249 and 250 of an add-subtract control member or slide 251 adapted to be located in three different longitudinal positions. The slide 251, through an arm lever 252, is adapted to condition the totalizer 16 for addition when it is located into the two extreme positions, and for subtraction when it is located in the central position, in the manner described in the copending United States patent application Ser. No. 537,489, dated Mar. 25, 1966, entitled: "Total Taking Device for a Printing Calculating or Like Machine."

Secured to the shaft 216 are also a pair of star members 253 and 254 each one having three arms, the arms of the two star members 253, 254 being mutually shifted 60 degrees. The star member 253 may cooperate with a pawl 256 fulcrumed on a pivot 257 of a projection 258 of a slide 259 and normally urged by a spring 261 to contact a pin 262 secured to the projection 258. The star member 254 may cooperate with a second pawl 263 similar to the pawl 256, but having also a projection 264 adapted to cooperate with a lug 266 of a lever 267 fulcrumed at 211 and pin and slot connected with the lever 155. The slide 259 is slidable on the shaft 194 and is linked at 269 with a lever 271 fulcrumed at 272 and cooperating with a pair of complementary cams 273 secured to the sleeve 44. Finally, fulcrumed on the lever 267 (FIG. 4) is a latch 274 adapted to cooperate with a lug 276 of the lever 38 and normally urged by a spring 277 to contact a pin 278 of a slide 279 fulcrumed on a pin 280 of the bail 111 (FIG. 6).

Normally, when the slide 259 (FIG. 9) is vertically reciprocated the two pawls 256 and 263 do not affect the two star members 253 and 254. In fact the pawl 256 does not meet any arm of the star member 253, whereas since the projection 264 of the pawl 263 encounters the lug 266, the pawl 263 is rocked counterclockwise and therefore is removed from the star member 253. As before described, during the first part of the auxiliary cycle wherein the divisor is printed, the program shaft 51 is displaced to the station XV. The cam 165 (FIG. 6) through the bail 162 displaces the link 160 upwards to its intermediate position. At the beginning of the cycle of the cycle of the shaft 30 (FIG. 5) wherein the divisor is automatically aligned, the lever 106' (FIG. 6) is rocked clockwise and displaces the link 160 forwards to its intermediate longitudinal position. The lever 155 is then rocked through such a predetermined angle as the lug 154 does not affect the lever 151 and the lug 186 does not release the projection 188 of the lever 189. On the contrary, the lever 267 (FIG. 9) is rotated clockwise so as to bring its lug 266 out of the path of the projection 264 of the pawl 263. However, the latch 274 (FIG. 4) does not engage yet the lug 276 of the lever 38.

During the first part of the following auxiliary cycle, the cams 273 of the sleeve 44 (FIG. 9) through the lever 271 and the slide 259 displace the two pawls 256 and 263 downwards. Since now the projection 264 of the pawl 263 no longer encounters the lug 166, it engages one of the arms of the star member 254. Thereafter during the second part of the auxiliary cycle, the cams 273 displace again the slide 259 upwards, whereby the pawl 263 rotates the star member 254 one step bodily with the shaft 216 and the star member 253, which now locates one of its arms in such a position as to be engaged by the pawl 256.

The cam 214 (FIG. 5) is rotated together with the shaft 216 and rocks the bail 210 counterclockwise. Now the lug 209 causes the bail 193 to be rocked clockwise thus moving the slide 197 upwards, whereby the shoulder 201 contacts the projection 203 of the sector 204. Furthermore, the arm 240 of the bail 210 through the link 241 and the lever 246 (FIG. 9) displaces the pawl 248 rearwards. The pawl 248 engages the shoulder 249 and displaces the slide 251 rearwards in the central position, thus predisposing the totalizer for subtraction. Finally, the bail 210 (FIG. 5) through the link 218 causes the notch 224 of the lever 219 to engage the pin 226 of the lever 223, and the notch 221 to disengage the pin 222.

During the first part of the auxiliary cycle wherein the divisor is aligned with the dividend, the program shaft 51 (FIG. 6) is displaced to the station XVI. Then the cam 165 through the bail 162 predisposes the link 160 in its highest position. At the end of the second part of the auxiliary cycle, the add key is again automatically depressed under the control of the program shaft 51 to start the division cycles. Particularly now a cycle of the shaft 30 is started, wherein the lever 106' is rocked clockwise thus additionally displacing the link 160 forwards. In turn the link 160 rocks the lever 159 additionally counterclockwise, thus causing the lug 154 through the cam slot 153 to rock the lever 151 counterclockwise. The lever 151 through the link 149 (FIG. 8) rocks the bail 140 clockwise thus causing the recess 144 of the link 137 to engage the pin 145 of the lever 146, and the recess 173 (FIG. 1) of the link 167 to engage the lug 174 of the lever 175.

Furthermore, when the lever 155 (FIG. 6) is so additionally rocked, the lug 186 releases the projection 188 of the lever 189, the projection 190 of which is caused to temporarily contact the lug 114 of the lever 46, while the lever 267 (FIG. 4) is additionally rocked, and causes the latch 274 to engage the lug 276 of the lever 38, and to rock same counterclockwise. Thereafter, during the first part of the auxiliary cycle the main shaft 32 is axially displaced rightwards to effect the division by higher speed cycles, while the cams 273 (FIG. 9) through the lever 271 and the link 259 lower again the two pawls 256 and 263. Finally during the first part of the auxiliary cycle the program shaft 51 (FIG. 6) is displaced to the station XVII.

Now when the lever 46 is rocked clockwise for starting the cycle of the main shaft 32, the projection 190 of the lever 189 is quickly moved over the lug 114 thus locking the lever 46 in the rocked position, whereby a set of repeated cycles of the main shaft 32 will be effected, till the lever 189 will not be restored clockwise. During each cycle of the main shaft 32, while the divisor is subtracted from the dividend, the cam 147 (FIG. 8) through the lever 146 displaces the link 137 forwards, thus causing the bail 134 to be rocked clockwise and the lug 129 of the slide 131 to engage the sector 21 of the highest order of the carriage 17 at the right of the racks 15 (FIG. 2). Simultaneously the cam 178 (FIG. 1) through the lever 175 displaces the link 167 rearwards, whereby the lever 168 through the lever 181 disengages the bar 182 from the sectors 21.

Thereafter the two cams 227 (FIG. 5) rock the lever 223 clockwise, thus displacing the lever 219 rearwards. Now the lever 219 rocks the bail 229 counterclockwise and through the spring 237 and the edge 238 rocks the lever 236, the projection 239 of which displaces the slide 131 upwards. The lug 129 of the slide 131 rocks the sector 21 clockwise one step, thus accumulating into said sector one digit of the quotient. Thereafter the cam 147 (FIG. 8) causes the lug 129 to disengage the sector 21, while the cam 178 (FIG. 1) causes the bar 182 to reengage the sectors 21. Finally, the cams 227 cause the slide 131 to return to the position of FIG. 5.

When the amount contained into the totalizer 16 (FIG. 1) becomes less than the divisor, in the next cycle of the shaft 32 an overdraft occurs and said amount becomes negative, whereby the sector 204 (FIG. 5) of the ten transfer of the highest order is rotated clockwise. The projection 203 of the sector 204 thus displaces the slide 197 downwards, whereby the bail 193 is rocked counterclockwise and returns to the angular position of FIG. 6. The arm 192 of the bail 193 now engages the lug 191 of the lever 189, which is rotated clockwise and releases the lug 114 of the lever 46 from its projection 190.

At the end of this cycle the lever 46 may be restored and stops the main shaft 32 which causes the second part of the auxiliary cycle to be effected. The cams 273 (FIG. 9) now return the slide 259 upwards, whereby the pawl 256 engages the star member 253 which effects a second step counterclockwise together with the shaft 216 and the cam 214 (FIG. 5). The bail 210 is now rocked clockwise and restores the lever 219 to the position of FIG. 5. Furthermore the lug 209 of the bail 210 contacts now the arm 207 of the bail 193, while the link 241 through the lever 246 (FIG. 9) causes the slide 251 to return forwards to the addition position of the FIG. 9.

Since the latch 274 (FIG. 4) holds the lever 38 rocked counterclockwise, as soon as the lever 46 is restored its lug 49 releases the lever 36, whereby simultaneously with the second part of the auxiliary cycle a new cycle of the shaft 30 is started. During the subsequent first part of the auxiliary cycle, the two cams 273 (FIG. 9) lower again the slide 259, whereby the pawl 263 engages one of the arms of the star member 254. During the subsequent cycle of the main shaft 32, the divisor is now added into the totalizer 16, thus effecting the correction of the overdraft subtracting cycle. Furthermore, the cams 227 (FIG. 5) through the lever 223 now displace the lever 219 forwards. This latter through the bail 229 and the lever 236 displaces the slide 131 downwards, whereby the lug 129 returns the sector 21 counterclockwise one step, thus effecting the correction of the quotient order.

At the end of this correction cycle of the shaft 32, the lever 46 (FIG. 6) is again restored, whereby the second part of the auxiliary cycle is started, during which the latch 263 (FIG. 9) rotates one step the star member 254. Therefore the shaft 216 returns to the condition adapted to control subtracting cycles. Simultaneously the shaft 30 is started again, whereby another sequence of cycles concerning the next lower order of the quotient is effected.

Since the universal bar 27 (FIG. 5) must zeroize the sectors 21, each sector 21 may be rocked at the most nine steps clockwise. When an order of the quotient is equal to nine, the main shaft 32 must accomplished ten subtracting cycles. During the tenth cycle, when the lever 219 is displaced rearwards, the lever 236 cannot follow the bail 229 counterclockwise, because the sector 21 is arrested by the universal bar 27. The lug 234 cooperating with the edge 238 of the arm 232 displaces the latter along the slot 233 and is shifted clockwise with respect to the edge 238. When the lever 219 will be longitudinally restored the slide 131 slides along its slots 132 (FIG. 2) and is thus lowered with respect to the rest position of FIG. 5. In the following correction cycle of the main shafts 32, the cams 227 will displace the lever 219 forwards. Since the slide 131 is now arrested in the lower position by the pins 133 (FIG. 2), the lever 236 (FIG. 5) cannot follow the bail 229, whereby it is shifted counterclockwise with respect to the bail 229, and therefore, to the position shown in FIG. 5.

*Step by step shifting of the divisor and of the quotient*

The lever 155 is provided with a projection 281 pin and slot connected with a lever 282 fulcrumed at 283 and having a projection 284 adapted to cooperate with a pin 285 of the lever 102. Fulcrumed on a pin 286 of the link 241 is a latch 287 adapted to operate with a lug 288 of a lever 290 secured to the shaft 97 and therefore bodily movable with the lever 101. The latch 287 is also connected through a pin 289 with a slide 291 slidably mounted on a stationary pin 292 and normally urged by a spring 293 to contact this pin. The slide 291 is provided with a projection 294 adapted to cooperate with the pivot 159 of the lever 155 when it is additionally rocked counterclockwise.

The program shaft 51 upon being displaced to the station XVI selects the sector 92 of the carriage 17 (FIG. 1) for step by step advancing the quotient leftwards. The cam 54 of the shaft 51 thus predisposes the link 59 of the carriage 17 in raised position, while the cam 56 predisposes the link 78 in lower position and the cam 128 (FIGS. 1 and 3) predisposes the link 123 in lower position. During the cycle of the shaft 30 relating to the first order of the quotient, the lever 89 engages the links 59, 78 and 123. Therefore the rack 63 engages the pinion 66 whereby the carriage 17 is predisposed for being displaced leftwards, the rack 82 engages the pinion 66 and the rack 123 engages the pinion 118, whereby both the carriage 22 and the rack 115 are predisposed for being displaced rightwards.

During this cycle the lever 155 (FIG. 5) is still located in its intermediate position. Therefore the lever 282 has been rocked clockwise, but its projection 289 has not reached the pin 285 of the lever 102. This latter remains thus in the position of FIG. 5 and controls the sector 92 for zeroizing the record of the number of orders set up in the carriage 17 (FIG. 1) after the carriage 22 has been aligned with the divisor.

Thereafter, when the lever 155 (FIG. 5) is additionally rocked, the projection 284 of the lever 282 rocks the lever 102 counterclockwise to the position shown by broken lines in FIG. 5 for causing the sector 92 to control the step by step advancement of the slide 94. Furthermore, the lever 155 through the pin 159 displaces the slide 291 rearwards, whereby the latch 287 rotates around the pivot 286 into the path of the lug 288 of the lever 290, thus preventing the engagement of the clutch of the shaft 71 (FIG. 1).

During the second part of the auxiliary cycle the shaft 216 is then rotated one step, thus returning to the position of FIG. 5. Then the cam 214 of the shaft 216 returns the bail 210 clockwise, whereby its lug 240 through the link 241 rocks the latch 287 around the pin 289, thus releasing the lug 288. Therefore, the cam 214 in the second part of each auxiliary cycle controls the latch 287 so that, in the cycle of the shaft 30 preceding a sequence of subtracting cycles, the latch 287 is predisposed out of the path of the lug 288 of the lever 390, while in the cycle of the shaft 30 preceding the correction cycle, the latch 287 is brought into the path of the lug 288. The engagement of the clutch of the shaft 71 is thus prevented by the latch 287 during the correction cycles, while it is effected in the cycles of the shaft 30 preceding the subtracting cycles relating to each quotient order following the highest order, whereby the quotient carriage 17 (FIG. 1) is then displaced one step leftwards, and the divisor carriage 22 and the rack 115 are displaced one step rightwards.

*Starting of the quotient shifting*

As it is known in the case wherein the dividend is a whole number, the first order of the quotient may be zero, whereas in the case the dividend is a decimal number less than one, many orders of the quotient may be zero. However, the highest significant order of the quotient should be accumulated on the highest order of the carriage 17, that is on the left hand end sector 21, whereby the leftwards step by step displacement of the carriage 17, till the main shaft 32 does not effect a subtraction cycle wherein an overdraft occurs in the totalizer.

To this end the bail 193 (FIG. 11) is provided with an arm 296 having a pin 297 normally urged by a spring 299 to contact a link 300 pivoted at 301 on a swing lever 302 and adapted to cooperate with the stationary shaft 211. The link 300 is provided with a lug 303 adapted to cooperate with a shoulder 304 of a slide 306 slidably mounted on the shaft 194 and linked with a lever 307 fulcrumed at 308. The lever 307 is also connected through a link 309 to a second lever 310 fulcrumed at 311 and adapted to cooperate with a cam 312 of the main shaft 32 when this latter is displaced rightwards.

The lever 302 is fulcrumed at 313 on an arm 314 of a bail 316 in turn fulcrumed on a stationary shaft 317, and is provided with a notch 318 normally engaging a second lug 319 of the lever 151. Another arm 321 of the bail 316 (FIG. 10) is provided with a lug 322 adapted to cooperate with a shoulder 323 of the link 59 and with a shoulder 324 of the link 105. Finally, a third arm 326 (FIG. 11) of the bail 316 is pin and slot connected with a pawl 327 adapted to cooperate with a lug 328 of a lever 329 fulcrumed at 156 and connected through a link 330 to the lever 42 (FIG. 4). The pawl 327 (FIG. 11) is pivoted at 331 on an arm 332 of a bail 335 also fulcrumed on the shaft 317 and is connected to the arm 326 of the bail 316 by a spring 333. The bail 335 is also provided with an arm 320 having a lug 334 adapted to cooperate with a shoulder 336 of the link 78 and with a shoulder 337 of the link 123.

Normally, when the cam 41 (FIG. 4) of the shaft 30, through the lever 42 and the link 330, rocks the lever 329 (FIG. 11) counterclockwise, the lug 328 does not affect the pawl 327. In the second part of the auxiliary cycle following the alignment of the divisor with the dividend, the bail 193 is rocked clockwise and the pin 297 causes the link 300 to contact the shaft 211. In the cycle of the shaft 30 relating to the first order of the quotient, the lever 151 is rocked counterclockwise and displaces the lever 302 upwards, whereby the link 300 locates its lug 303 into the path of the shoulder 304. Furthermore, the lever 302 rocks the bail 316 clockwise, whereby the lug 322 (FIG. 10) on one hand lowers the link 59 to predispose the engagement of the rack 63 (FIG. 1) with the arm 68 of the bail 69, on the other hand it lowers the link 105 (FIG. 10) to predispose the disengagement of the latch 76.

If during the subsequent cycle of the main shaft 32 the sector 204 (FIG. 5) is rotated, that is if the divisor is greater than the dividend, the bail 193 is rocked counterclockwise and the pin 297 (FIG. 11) raises the link 300 which returns its lug 303 out of the path of the shoulder 304. At the end of the cycle of the shaft 32 the cam 312, through the lever 310, the link 309 and the lever 307, displaces the slide 306 rearwards without affecting the link 300. Similarly the slide 306 does not affect the link 300 during the following correction cycle, since the bail 193 is held rocked in the position of FIG. 11 by the bail 210.

In the cycle of the shaft 30 following the subsequent correction cycle, after the carriage 22 (FIG. 1) has been displaced one step rightwards together with the capacity rack 115 (FIG. 3) and the slide 94 (FIG. 5), the lever 42 (FIG. 4) through the link 300 rocks the lever 329 (FIG. 11) counterclockwise. The lug 328 now engages the pawl 327 and rocks the bail 335 counterclockwise. The lug 334 thus raises the links 78 and 123. During the first part of the subsequent auxiliary cycle, the lever 89 (FIGS 1 and 3) engages the racks 82 and 115 with the arms 84, and 119 respectively, of the bail 69. Then in the second part of the auxiliary cycle the link 105 (FIG. 10) causes the latch 76 (FIG. 1) to release the pinions 73, whereby the slide 94 (FIG. 5) is restored rightwards.

Therefore, after each pair of machine cycles comprising a subtracting cycle and to the following correction cycle and relating to non significant orders of the quotient, the carriage 17 (FIGS. 1 and 3) is transversely locked at rest by the bail 69, while the carriage 22 and the rack 115 are returned step by step rightwards. Futhermore, the slide 94 is also restored to its rightward position, and to this end when the latch 76 is disengaged, the rack 82 of the carriage 22 is held locked in the reached position by the bail 69.

In the first subtracting cycle of the main shaft 32, wherein no overdraft occurs in the dividend contained in the totalizer 16 (FIG. 5), the sector 204 is not rocked and does not rock the bail 193 counterclockwise, whereby the link 300 (FIG. 11) remains with the lug 303 in the path of the shoulder 304. When the cam 312 displaces the slide 306 rearwards, the link 300 is displaced rearwards and rocks the swing lever 302 so as to disengage its notch 318 from the lug 319 of the lever 151.

Now the spring 299 returns the lever 302 downwards thus returning the bail 316 to the position of FIG. 11. Now this bail enables the link 59 (FIG. 10) to predispose the engagement of the rack 63 (FIG. 1) with the pinion 66 for displacing the carriage 17 leftwards, and causes the link 105 (FIG. 10) to be returned in such a position as to prevent the operation of the latch 76 (FIG. 1), whereby now departing from this instant, the slide 94 (FIG. 5) is step by step displaced leftwards together with the carriage 17. Furthermore, the arm 326 of the bail 316 (FIG. 11) displaces the pawl 327 out of the path of the lug 328, whereby the links 78 and 123 are no longer displaced upwards to their central position.

It is thus clear that the means 59, 63 (FIG. 1) are normally ineffective for displacing the quotient carriage 17 step by step with respect to the counting member 129, and will be rendered effective in the first division cycle wherein no overdraft occurs in the dividend contained into the totalizer.

*Stop division and printing of quotient and remainder*

The bail 162 (FIG. 6) which controls the division link 160 is provided with an arm 338 normally contacted by a pin 340 of a lever 341 fulcrumed at 342, under the urge of a spring 339. Fulcrumed on the lever 341 is a latch 343 adapted to cooperate with a pin 344 of the program control lever 52. The latch 343 is also pin and slot connected with a lever 345 also pivoted at 342 and connected through a link 347 to a horizontal lever 348 (FIG. 7) fulcrumed at 349. The lever 348 is normally urged by a spring 350 to contact a stationary stop 351 and holds its projection 352 on the path of a lug 353 of the capacity rack 115 as shown in FIG. 7. The lever 345 is also provided with a lug 354 (FIG. 6) cooperating with a pawl 355 fulcrumed on an arm 356 of a bail 357 in turn pivoted at 358. Another arm 359 of the bail 356 is normally urged by a spring 360 to contact the pin 280 of the bail 111. The pawl 355 is also connected through a link 361 to the lever 341 and lies normally out of the path of the lug 354.

During the auxiliary cycle relating to the first quotient order, the program shaft 51 was displaced to the station XVII. The cam 165 then rocks the bail 162 clockwise through its maximum stroke, and the arm 338, through the lever 341 and the link 361, causes the pawl 355 to engage the lug 354. In turn the lever 341 displaces the latch 343 upwards, thus restoring the lever 52. The program shaft 51 is thus prevented from being displaced as long as the lever 52 is engaged by the latch 343.

When the lowest quotient order is accumulated digit by digit, the capacity rack 115 has been returned to the rest position shown in FIG. 7. In the cycle of the shaft 30 following the last correction cycle, the shaft 71 (FIG. 1) displaces the carriage 17 leftwards thus locating the sector 21 wherein the lowest quotient order has been accumulated on the plane of the lowest order rack 15. Furthermore, the shaft 71 displaces both the carriage 22 and the capacity rack 115 (FIG. 7) rightwards. The rack 115 thus accomplishes a further step behind the rest position, whereby it rocks the lever 348 clockwise.

Now the lever 348 through the link 347 (FIG. 6) rocks the lever 345 clockwise, thus displacing the pawl 355 forwards and rocking the bail 357 clockwise. The bail 111 then one one hand through the link 112 locates the latch 113 into the path of the lug 114 of the lever 46, whereby the cycle of the main shaft 32 is now prevented, on the other hand through the link 279 (FIG. 4) and the pin 278 causes the latch 274 to disengage the lug 276, whereby the lever 38 now controls again the latch 33. Furthermore, the lever 345 (FIG. 6) when rocked clockwise disengages the latch 343 from the pin 344, whereby the lever 52 may be rocked clockwise by its spring 53 and during the auxiliary cycle it causes the program shaft 51 to be displaced from the station XVII to the station XVIII.

At the end of the auxiliary cycle in the station XVIII a non add key is automatically depressed thus causing a machine cycle during which the division link 160 is restored. Furthermore, during the first part of the auxiliary cycle, the main shaft 32 is returned leftwards to the lower speed cycle position, while the program shaft 51 is displaced to the station XIX. During the cycle of the main shaft 32 the quotient stored in the carriage 17 is now printed. In the second part of the auxiliary cycle the two carriages 17 and 22 are returned rightwards, while a total key is depressed thus controlling a total taking machine cycle. During this latter cycle the remainder is printed and the totalizer 16 (FIG. 1) is cleared, while the program shaft 51 is returned to the station I, whereby the machine is stopped.

*Negative division*

Since in each calculating cycle the totalizer 16 engages the racks 15 during the advancing stroke of the racks 15 (leftward stroke in FIG. 1), in the total cycles if the total is positive the register 16 must be reversed with respect to the adding cycles, whereas if the total is negative it must be reversed with respect to the subtracting cycles. In the subtracting cycles the slide 251 (FIG. 9) is displaced rearwards into its intermediate position. In the total cycles, under the control of a total sign indicating member, the slide 251 is displaced to its intermediate position if the total is positive, to its extreme rearward position if the total is negative, in the manner described in the cited copending patent application Ser. No. 537,489, entitled: "Total Taking Device for a Calculating or Like Machine."

As described before, the dividend of a division may be contained in the totalizer as a result of preceding operations. In the case the dividend is negative, the quotient of the division is formed by means of adding cycles, while for the correction cycle a subtracting cycle will be effected. To this end the slide 251 is provided with a pin 370 engaging a slot 361 of a second slide 362 slidably mounted on a stationary pin 363 and normally urged by a spring 364 to contact the same pin. The slide 362 is provided with a lug 365 adapted to cooperate with a projection 366 of a lever 367 fulcrumed at 58 and normally urged by a spring 368 to contact a cam 369 of the program shaft 51.

In the cycle wherein the divisor is aligned with the dividend, the program shaft 51 is located into the station XV, wherein the cam 369 causes the lever 367 to be rocked clockwise. If the dividend is positive, when the sub total is taken for aligning the divisor, the slide 251 is displaced to its intermediate position and the pin 370 does not affect the slide 362. During the division the pawl 248 engages the shoulder 249 of the slide 251 and the totalizer 16 is controlled in the manner above described.

Figure 9:
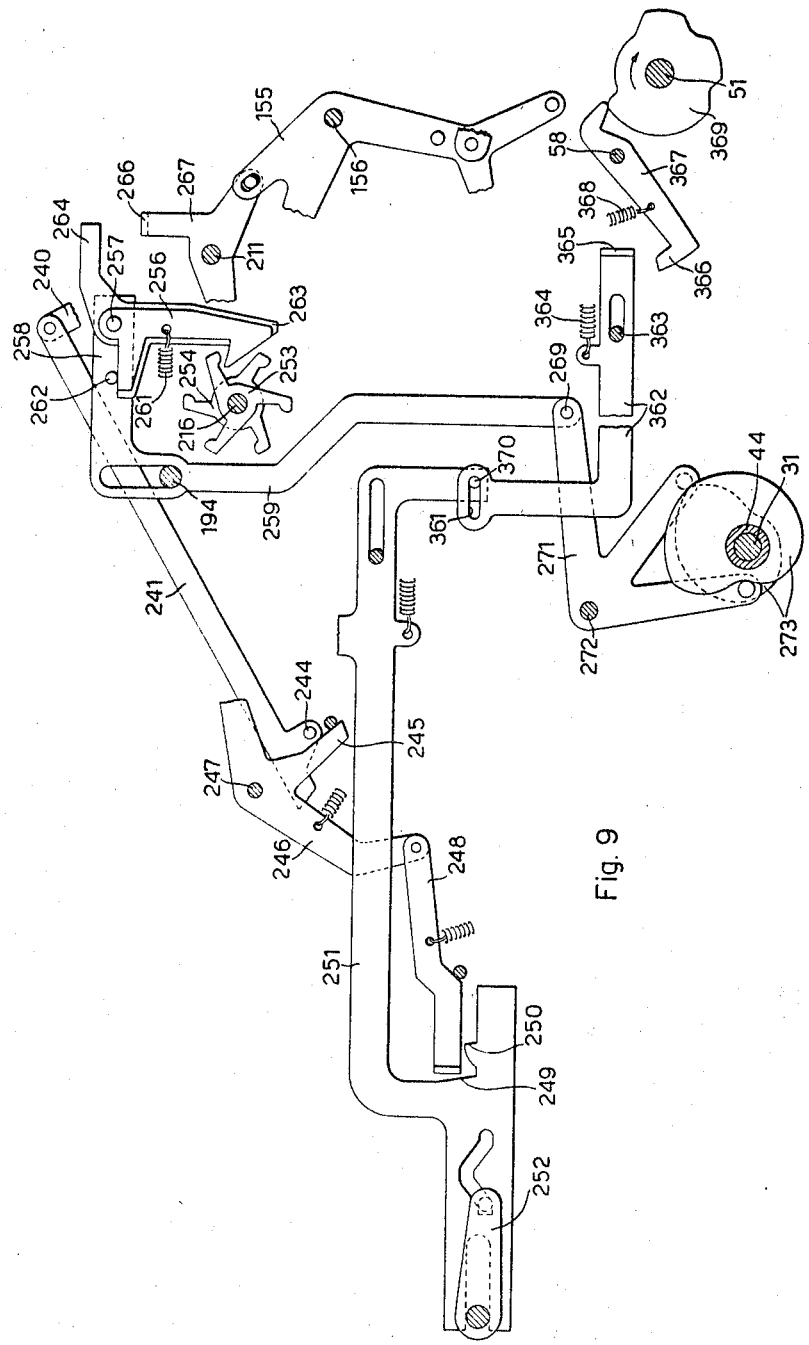
FIG. 9 is another left hand sectional view of the calculating machine.

On the contrary, if the dividend is negative, when the sub total is taken the slide 251 is displaced rearwards through its maximum stroke and by means of the pin 360 it displaces the slide 362 rearwards. This latter thus locates its lug 365 behind the lug 366 of the lever 367 and is locked by this lug in the reached position. Therefore, at the end of the cycle, the slide 251 instead of being returned to the position of FIG. 9, is arrested in its intermediate position, whereby during the division the pawl 248 cooperates with the shoulder 250 and under the control of the cam 214 (FIG. 5) it predisposes the slide 251 for addition at the beginning of the quotient accumulating cycles and for subtraction at the beginning of the correction cycles.

It is intended that many changes, improvements and additions of parts may be made to the described calculating machine, without departing from the scope of the invention as defined in the appended claims.

What I claim is:

1. A ten key calculating machine adapted to effect multiplications as well as divisions, having a first memory for storing a multiorder multiplicand, a second memory for storing a multiorder multiplier, each one of said memories comprising in each order a differentially settable member, a set of actuators adapted to alternately cooperate with said memories, and a totalizer, and comprising in combination:
    (a) means for causing said first memory to transfer a dividend to said totalizer,
    (b) means operable after so transferring a dividend for storing a divisor in said second memory,
    (c) and counting means for sequentially accumulating in each order of said first memory the digits of a quotient.

2. A ten key calculating machine adapted to effect multiplications as well as divisions, having a first memory for storing a multiorder multiplicand, a second memory for storing a multiorder multiplier, displacing means for transversely displacing a selected one of said memories, each one of said memories comprising in each order a differentially settable member, a set of actuators adapted to alternately cooperate with said memories, and a totalizer, and comprising in combination:
    (a) means for causing said first memory to transfer a dividend to said totalizer,
    (b) means operable after so transferring a dividend for storing a divisor in said second memory,
    (c) a counting member for accumulating the digits of each quotient order in the member of said first memory of the highest order immediately at right of said actuators,
    (d) and control means for automatically back transferring a total taken from said totalizer to said first memory.

3. A ten key calculating machine having a pair of memories each one comprising in each order a differentially settable member, a set of actuators adapted to alternately cooperate with said memories, and a totalizer, and comprising in combination:
    (a) means for causing a first memory of said pair to transfer a dividend to said totalizer,
    (b) means operable after so transferring a dividend for storing a divisor in a second memory of said pair,
    (c) a counting member for accumulating the digits of each quotient order in the member of said first memory of the highest order immediately at right of said actuators,
    (d) normally ineffective means for step by step displacing said first memory with respect to said counting member,
    (e) and means controlled by an overdraft sensing member for rendering said displacing means effective in the first division cycle wherein no overdraft occurs in said totalizer.

4. A ten key calculating machine having a pair of memories each one comprising in each order a differentially settable member, a set of actuators adapted to alternately cooperate with said memories, and a totalizer, and comprising in combination:
    (a) means for causing a first memory of said pair to transfer a dividend to said totalizer,
    (b) means operable after so transferring a dividend for storing a divisor in a second memory of said pair,
    (c) a counting member for accumulating the digits of each quotient order in the member of said first memory of the highest order immediately at right of said actuators,
    (d) means for displacing said second memory step by step rightwards each time an overdraft occurs in said totalizer,
    (e) normally ineffective motion reversing means for connecting said first memory to said second memory so as to be displaced in mutually opposite directions,
    (f) and means controlled by an overdraft sensing member for rendering said reversing means effective in the first division cycle wherein no overdraft occurs in said totalizer.

5. A ten key calculating machine having a pair of memories, displacing means for transversely displacing a selected one of said memories, each one of said memories comprising in each order a differentially settable member, a set of actuators adapted to alternately cooperate with said memories, and a totalizer, and comprising in combination:

(a) means for causing a first memory of said pair to transfer a dividend to said totalizer,
(b) means operable after so transferring a dividend for storing a divisor in a second memory of said pair,
(c) a counting member adapted to engage the member of said first memory of the highest order at right of said actuators,
(d) means cyclically operable during a division for causing said counting member to displace the member so engaged one step in a direction corresponding each time to the sign of the dividend in said totalizer,
(e) and means for rendering said counting member ineffective upon displacing said engaged member nine steps.

6. A ten key calculating machine having a pair of memories, displacing means for transversely displacing a selected one of said memories, each one of said memories comprising in each order a differentially settable member, a set of actuators adapted to alternately cooperate with said memories, and a totalizer, and comprising in combination:
(a) means for causing a first memory of said pair to transfer a dividend to said totalizer,
(b) means operable after so transferring a dividend for storing a divisor in a second memory of said pair,
(c) a counting member adapted to engage the member of said first memory at right of said actuators,
(d) means cyclically operable during a division for causing said counting member to displace the member so engaged one step in a direction corresponding each time to the sign of the dividend in said toalizer,
(e) a yieldable connection for holding said cyclically operable means in a predetermined position with respect to said counting member,
(f) means for positively arresting the members of said first memory after being displaced nine steps, so as to cause said counting member to be displaced one step with respect to said cyclically operated member upon arresting a member of said first memory,
(g) and an arresting member for said counting member for causing said counting member to be returned to said predetermined position when said cyclically operated means are operated in a direction opposite to that of said nine steps.

7. A ten key calculating machine having a pair of memories each one comprising in each order a differentially settable member, a set of actuators adapted to alternately cooperate with said memories, and a totalizer, and comprising in combination:
(a) means for causing a first memory of said pair to transfer a dividend to said totalizer,
(b) means operable after so transferring a dividend for storing a divisor in a second memory of said pair,
(c) a counting member for accumulating the digits of each quotient order in the member of said first memory of the highest order immediately at right of said actuators,
(d) an add-subtract control member,
(e) a ten transfer member associated with the highest order of said totalizer,
(f) a lobed cam adapted to operate said add-subtract control member,
(g) and means conditioned by said ten transfer member when operated for advancing said lobed cam one advancing step equal to half the distance between two adjacent lobes.

8. A ten key calculating machine having a pair of memories each one comprising in each order a differentially settable member, a set of actuators adapted to alternately cooperate with said memories, and a totalizer, and comprising in combination:
(a) means for causing a first memory of said pair to transfer a dividend to said totalizer,
(b) means operable after so transferring a dividend for storing a divisor in a second memory of said pair,
(c) a counting member for accumulating the digits of each quotient order in the member of said first memory of the highest order immediately at right of said actuators,
(d) an add-subtract control member,
(e) a ten transfer member associated with the highest order of said totalizer,
(f) a lobed cam having a number of lobes for operating said add-subtract control member,
(g) a pair of star members secured to said lobed cam and each one having a number of arms equal to said number of lobes, said star members being mutually shifted half the distance of two adjacent lobes,
(h) a pair of pawls for engaging each one of said star members to advance same a step equal to said distance, a predetermined pawl of said pair being normally effective for operating an arm of the corresponding star member,
(i) and a stop member for rendering said predetermined pawl ineffective until said ten transfer member is not operated.

9. A ten key calculating machine having a pair of memories, each one comprising in each order a differentially settable member, a set of actuators adapted to alternately cooperate with said memories, and a totalizer, and comprising in combination:
(a) means for causing a first memory of said pair to transfer a dividend to said totalizer,
(b) means operable after so transferring a dividend for storing a divisor in a second memory of said pair,
(c) a counting member for accumulating the digits of each quotient order in the member of said first memory of the highest order immediately at right of said actuators,
(d) a ten transfer member associated with the highest order of said totalizer,
(e) an add-subtract control member adapted to be located in three different adjacent positions for predisposing said totalizer for addition when it is located in its two extreme positions and for subtraction when it is located in the central position,
(f) a lobed cam having a number of lobes each one adapted to displace said add-subtract control member to the next following position,
(g) and means conditioned by said ten transfer member when operated for advancing said lobed cam one advancing step equal to half the distance between two adjacent lobes.

10. A machine according to claim 9, comprising in combination:
(h) a program control device adapted to be sequentially arrested in a sequence of stations associated with the division operation,
(i) means controlled by said device for previously locating said add-subtract control member in a predetermined one of said three positions according to the sign of the dividend,
(j) and yielding means also controlled by said device for yieldably locking said add-subtract control member in said predetermined positions, for enabling said lobed cam to displace same from said predetermined position.

11. A ten key calculating machine having a pair of memories, each one comprising in each order a differentially settable member, a set of actuators adapted to alternately cooperate with said memories, and a totalizer, and comprising in combination:
(a) means for causing a first memory of said pair to transfer a dividend to said totalizer, (b) means operable after so transferring a dividend for storing a divisor in a second memory of said pair, (c) a counting member for accumulating the digits of each quotient order in the member of said first memory of the highest order immediately at right of said actuators, (d) means for aligning said second memory with the dividend contained into said totalizer before the beginning of a division, (e) a member differentially movable from an initial position for indicating the number of orders of the quotient, (f) connecting means for connecting said indicating member with said second memory before being so aligned, (g) and means controlled by said indicating member when returned to said initial position for stopping the division.

12. A ten key calculating machine having a pair of memories, each one comprising in each order a differentially settable member, a set of actuators adapted to alternately cooperate with said memories, and a totalizer, and comprising in combination:

(a) means for causing a first memory of said pair to transfer a dividend to said totalizer, (b) means operable after so transferring a dividend for storing a divisor in a second memory of said pair, (c) a counting member for accumulating the digits of each quotient order in the member of said first memory of the highest order immediately at right of said actuators, (d) means for aligning said second memory with the dividend contained in said totalizer before the beginning of a division, (e) a member differentially movable from an initial position for indicating the number of orders of the quotient, (f) connecting means for connecting said indicating member with said second memory before being so aligned, (g) a program control device adapted to be sequentially arrested in a sequence of stations associated with the division operation, (h) a control member cyclically movable for causing said device to be displaced from a station to another of said sequence, (i) a locking member for locking said control member against movement, (j) and means operable by said indicating member when returned behind said initial position for releasing said control member to cause said device to be displaced.

References Cited

UNITED STATES PATENTS

| | | | |
|---|---|---|---|
| 2,758,789 | 8/1956 | Ellerbeck | 235—63 |
| 2,821,342 | 1/1958 | Capellaro | 235—60 |
| 2,956,742 | 10/1960 | Colvin | 235—63 |
| 2,970,754 | 2/1961 | Gang | 235—60 |
| 3,116,873 | 1/1964 | Trumpelmann et al. | 235—63 |
| 3,216,657 | 11/1965 | Chall | 235—60 |

STEPHEN J. TOMSKY, *Primary Examiner.*